(12) United States Patent
Lariviere et al.

(10) Patent No.: US 11,232,501 B2
(45) Date of Patent: Jan. 25, 2022

(54) MACHINE-LEARNING FOR COMBINATORIAL DECISIONING

(71) Applicant: Microsoft Technology Licensing, LLC, Redmond, WA (US)

(72) Inventors: Jacob Sean Lariviere, Seattle, WA (US); Jason Thorpe, Renton, WA (US); Stephen Bruce Broschart, Mercer Island, WA (US); Shujuan Huang, Bellevue, WA (US); Xin Yang, Bellevue, WA (US); Alperen Kok, Bellevue, WA (US); Shiqi Wen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 52 days.

(21) Appl. No.: 16/794,954

(22) Filed: Feb. 19, 2020

(65) Prior Publication Data

US 2021/0182927 A1 Jun. 17, 2021

Related U.S. Application Data

(60) Provisional application No. 62/947,929, filed on Dec. 13, 2019.

(51) Int. Cl.
*G06Q 30/00* (2012.01)
*G06Q 30/06* (2012.01)
(Continued)

(52) U.S. Cl.
CPC ......... *G06Q 30/0611* (2013.01); *G06F 17/16* (2013.01); *G06F 17/18* (2013.01);
(Continued)

(58) Field of Classification Search
None
See application file for complete search history.

(56) References Cited

U.S. PATENT DOCUMENTS 8,190,537 B1 5/2012 Singh et al.
10,331,681 B1 6/2019 Chen et al.
(Continued)

OTHER PUBLICATIONS

"International Search Report and Written Opinion Issued in PCT Application No. PCT/US2020/060314", dated Feb. 22, 2021, 11 Pages.
(Continued)

*Primary Examiner* — Naeem U Haq
(74) *Attorney, Agent, or Firm* — Mannava & Kang, P.C.

(57) ABSTRACT

According to examples, an apparatus may include a processor and a memory on which is stored machine readable instructions that may cause the processor to generate a matrix based on features of reference entities and a respective allocation of value provided to each reference entity, apply first-stage machine-learning on the matrix to identify relevant features of the reference entities that correlate with the respective allocation of value provided to each reference entity, and access an identity of a target entity and target features of the target entity. The instructions may further cause the processor to apply second-stage machine-learning to generate a cluster comprising the target entity and a set of the reference entities based on the relevant features and determine a distribution of values allocated to the set. The distribution of values may be used to generate or assess a target allocation of value for the target entity.

20 Claims, 7 Drawing Sheets

(51) Int. Cl.
*G06N 20/00* (2019.01)
*G06F 17/16* (2006.01)
*G06F 17/18* (2006.01)
*G06K 9/62* (2006.01)

(52) U.S. Cl.
CPC .......... *G06K 9/6218* (2013.01); *G06N 20/00* (2019.01); *G06Q 30/0629* (2013.01)

(56) References Cited

U.S. PATENT DOCUMENTS

| | | | |
|---|---|---|---|
| 10,496,691 B1 * | 12/2019 | Chen | ............. G06F 16/9038 |
| 2016/0012511 A1 | 1/2016 | Braziunas et al. | |
| 2017/0316459 A1 | 11/2017 | Strauss et al. | |
| 2018/0181901 A1 | 6/2018 | Babcock et al. | |
| 2019/0164096 A1 | 5/2019 | Borje et al. | |
| 2019/0311301 A1 | 10/2019 | Pyati | |
| 2021/0216813 A1 * | 7/2021 | Pouyan | ............. G06K 9/6269 |

OTHER PUBLICATIONS

"Smart CPQ (Configure, Price, Quote) Software", Retrieved from: https://web.archive.org/web/20190827091359/https:/pros.com/products/cpq-software/, Aug. 27, 2019, 15 Pages.

Bengio, et al., "Machine Learning for Combinatorial Optimization: a Methodological Tour d'Horizon?", In Journal of Computing Research Repository, Nov. 2018, pp. 1-34.

Bradley, et al., "Constrained K-Means Clustering", In Microsoft Research-TR-2000-65, May 2000, 9 Pages.

Jiang, et al., "Improving Personalization Solutions through Optimal Segmentation of Customer Bases", In Journal of IEEE transactions on knowledge and data engineering, vol. 21, Issue 3, Mar. 2009, pp. 1-16.

Lombardi, et al., "Boosting Combinatorial Problem Modeling with Machine Learning", In Proceedings of the Twenty-Seventh International Joint Conference on Artificial Intelligence, Jul. 13, 2018, pp. 5472-5478.

Vivek, Sowmya, "Clustering Algorithms for Customer Segmentation", Retrieved from: https://towardsdatascience.com/clustering-algorithms-for-customer-segmentation-af637c6830ac, Aug. 13, 2018, 12 Pages.

Wang, Alexander, "Encode Smarter: How to Easily Integrate Categorical Encoding into Your Machine Learning Pipeline", Retrieved from: https://blog.featurelabs.com/encode-smarter/, Aug. 26, 2019, 14 Pages.

Wang, Alexander, "Generalized Low Rank Models (GLRM)", Retrieved from: https://web.archive.org/web/20160914042925/http:/docs.h2o.ai/h2o/latest-stable/h2o-docs/data-science/glrm.html, Sep. 14, 2016, 4 Pages.

Wilder, et al., "Melding the Data-Decisions Pipeline: Decision-Focused Learning for Combinatorial Optimization", In Proceedings of the AAAI Conference on Artificial Intelligence, vol. 33, Jul. 17, 2019, 10 Pages.

* cited by examiner

200
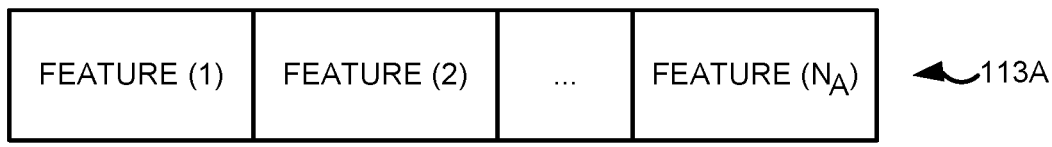
◄— 113A
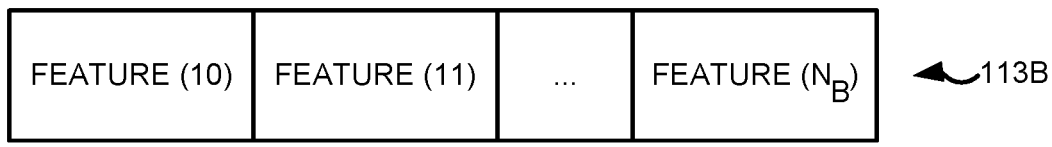
◄— 113B
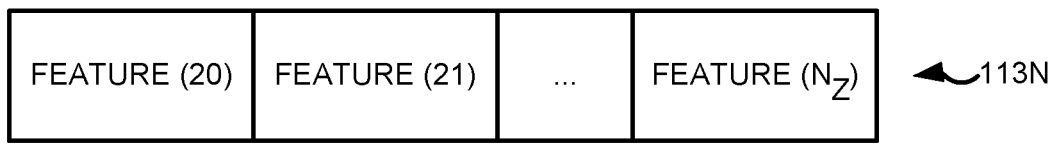
◄— 113N
FIG. 2

500

```
ACCESS FEATURES OF A PLURALITY OF REFERENCE ENTITIES AND
A RESPECTIVE ALLOCATION OF VALUE PROVIDED TO EACH
REFERENCE ENTITY OF THE PLURALITY OF ENTITIES
502
```

↓

```
PRE-PROCESS THE FEATURES FOR MACHINE-LEARNING
504
```

↓

```
IDENTIFY RELEVANT FEATURES OF THE PLURALITY OF REFERENCE
ENTITIES THAT CORRELATE WITH THE RESPECTIVE ALLOCATION OF
VALUE PROVIDED TO EACH REFERENCE ENTITY
506
```

```
ACCESS AN IDENTITY OF A TARGET ENTITY TO WHICH A VALUE FOR
THE TARGET ENTITY IS TO BE ALLOCATED OR ASSESSED
602
```

↓

```
CLUSTER THE TARGET ENTITY AND A PLURALITY OF REFERENCE
ENTITIES BASED ON RELEVANT FEATURES THAT CORRELATE WITH
ALLOCATED VALUES FOR THE PLURALITY OF REFERENCE ENTITIES
604
```

↓

```
DETERMINE A DISTRIBUTION OF ALLOCATED VALUES BASED ON
THE CLUSTERING
606
```

*FIG. 6*

COMPUTER-READABLE MEDIUM
700

GENERATE A MATRIX BASED ON FEATURES OF A PLURALITY OF REFERENCE ENTITIES AND A RESPECTIVE ALLOCATION OF VALUE PROVIDED TO EACH REFERENCE ENTITY OF THE PLURALITY OF ENTITIES
702

IDENTIFY RELEVANT FEATURES OF THE PLURALITY OF REFERENCE ENTITIES THAT CORRELATE WITH THE RESPECTIVE ALLOCATION OF VALUE PROVIDED TO EACH REFERENCE ENTITY
704

ACCESS AN IDENTITY OF A TARGET ENTITY AND TARGET FEATURES OF THE TARGET ENTITY
706

GENERATE A CLUSTER COMPRISING THE TARGET ENTITY AND A SET OF THE PLURALITY OF REFERENCE ENTITIES BASED ON THE RELEVANT FEATURES OF THE PLURALITY OF REFERENCE ENTITIES AND THE TARGET FEATURES OF THE TARGET ENTITY, THE SET COMPRISING SOME OR ALL OF THE PLURALITY OF REFERENCE ENTITIES
708

DETERMINE A DISTRIBUTION OF VALUES ALLOCATED TO THE SET OF THE PLURALITY OF REFERENCE ENTITIES IN THE CLUSTER, THE DISTRIBUTION OF VALUES BEING USED TO GENERATE OR ASSESS A TARGET ALLOCATION OF VALUE FOR THE TARGET ENTITY
710

*FIG. 7*

MACHINE-LEARNING FOR COMBINATORIAL DECISIONING

RELATED APPLICATIONS

This application claims priority to U.S. Provisional Patent Application No. 62/947,929, filed on Dec. 13, 2019, the content of which is incorporated by reference in its entirety herein.

BACKGROUND

Combinatorial decisioning systems may generate outputs based on analyses of multiple variables. For example, cloud computing resources or network load balancing systems may output an allocation of computational resources based on features such as computational requirements, current resource loads, and services requested, among others. Configure, price, quote ("CPQ") systems may output an allocation of pricing, such as discounts or other value, based on combinatorial pricing that takes into account various features of a customer such as region (geographic location), sector, and size, among others.

BRIEF DESCRIPTION OF DRAWINGS

Features of the present disclosure are illustrated by way of example and not limited in the following figure(s), in which like numerals indicate like elements, in which:

FIG. 2 shows a block diagram of examples of feature bins depicted in FIG. 1, in accordance with an embodiment of the present disclosure;

FIG. 5 shows a flow diagram of a method for identifying relevant features that correlate with allocated values for reference entities, in accordance with embodiments of the present disclosure;

FIG. 6 shows a flow diagram of a method for clustering a target entity with reference entities based on features identified by the method illustrated in FIG. 5, in accordance with embodiments of the present disclosure; and FIG. 7 depicts a block diagram of a computer-readable medium that may have stored thereon computer-readable instructions for performing machine-learning to identify features that are predictive of a value allocated to reference entities to determine or assess a target allocation for a target entity, in accordance with an embodiment of the present disclosure.

DETAILED DESCRIPTION

Figure 1:
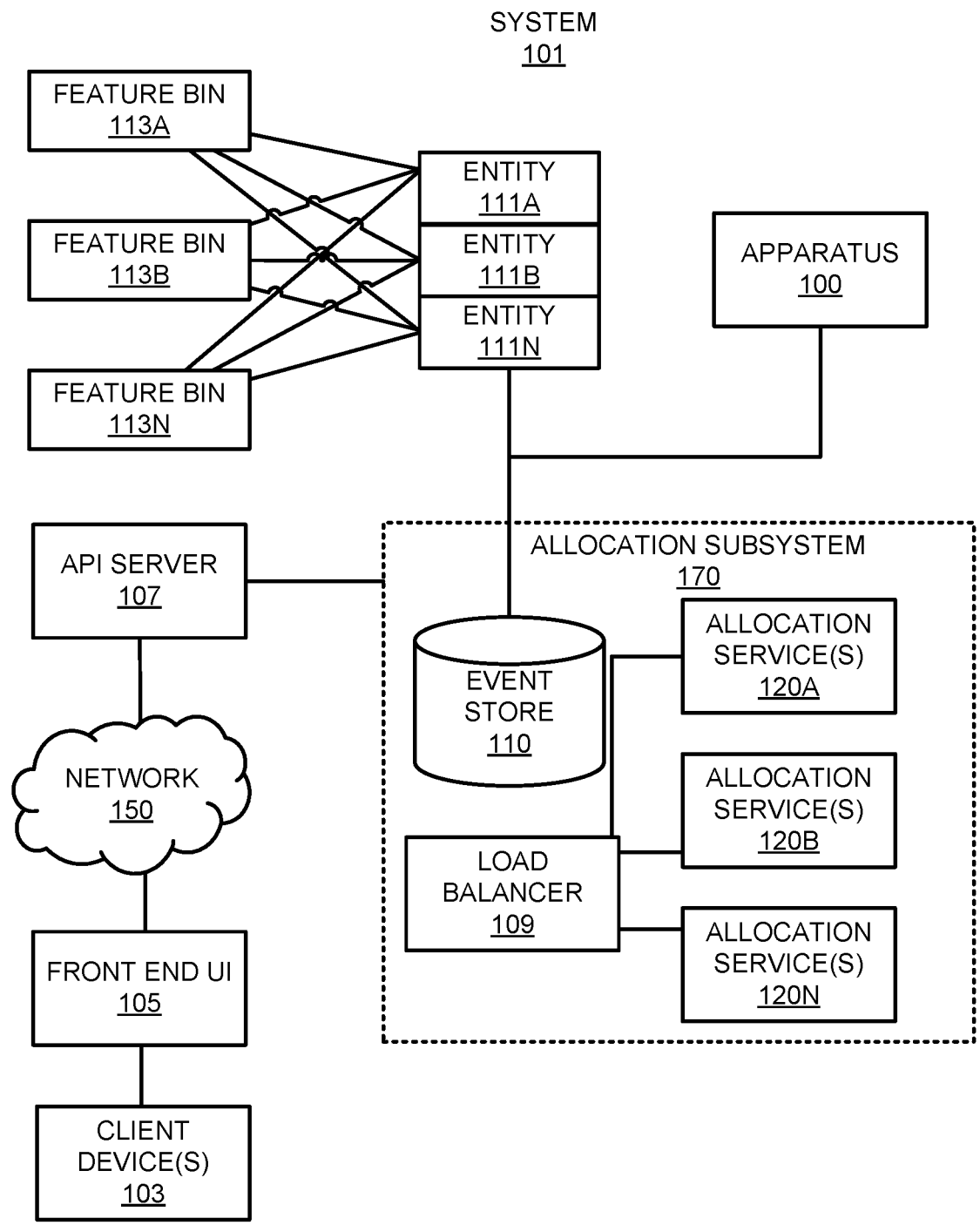
FIG. 1 shows a block diagram of a system that may include an apparatus, in which the apparatus may execute machine-learning to identify features that may be predictive of values allocated to reference entities to determine or assess a target allocation for a target entity, in accordance with an embodiment of the present disclosure.

Disclosed herein are apparatuses, methods, and computer-readable media in which a processor may apply multi-stage, sequential, machine-learning that may improve systems to address combinatorial decisioning and other types of matters. Combinatorial decisioning matters may arise when total combinations of feature variables are large and a given combination of variables is therefore relatively rare. Thus, comparing an entity to other entities to identify comparable entities may be computationally difficult since the data spread may be wide and features of other entities comparable to features of the entity may therefore be low.

An example of a combinatorial decisioning matter may include a combinatorial pricing matter, which may arise when customers are spread out geographically, in different industries, varied in size, or otherwise may be characterized with different features. The data spread of these and other customer features may therefore be high, which may make comparisons of a particular customer to another customer difficult. Thus, it may be difficult to determine pricing and/or discounts for the particular customer because it may be difficult to identify a comparable customer for pricing/discounting comparison.

In an example improvement, a processor may train and use machine-learning models to determine pricing for customers in a combinatorial pricing matter. In particular, the processor may be improved to identify and weight features that may be relevant to a value allocation (such as a price and/or discount) for a reference entity (such as a customer) during a first-stage machine-learning, and use the identified features to cluster a target entity with reference entities during a second-stage machine-learning. In this manner, the target entity (such as a customer) may be clustered with reference entities (such as comparable customers) based on a similarity of relevant features, identities of which may have been learned during the first-stage machine-learning. Thus, the processor may learn features important for clustering and comparing customers during the first-stage machine-learning and cluster the customers based on the learned features during the second-stage machine-learning.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

FIG. 1 shows a block diagram of a system 101 that may include an apparatus 100, in which the apparatus 100 may perform machine-learning to identify features that may be predictive of values allocated to reference entities to determine or assess a target allocation for a target entity, in accordance with an embodiment of the present disclosure. In some examples, the system 101 may include an allocation subsystem 170 that may determine an allocation of value to be provided to an entity 111 (illustrated in FIG. 1 as entities 111A-N) and/or assess an allocation of value already provided to the entity 111. Depending on the particular implementation of the system 101, the value may include a computational resource, a price or discount, and/or other value to be allocated for an entity. For example, the allocation subsystem 170 may include a cloud services platform that allocates a value (computational resources) to a request (an entity 111), a CPQ or other quoting platform that allocates a price or discount to a customer (an entity 111), and/or other system that may allocate or assess other types of value.

In some examples, a user or operator of the system 101 may interact with the allocation subsystem 170 via a client device 103. The client device 103 may access a front end user interface ("UI") 105. The front end UI 105 may communicate, through a network 150 (such as the Internet or other Wide Area Network), with an API server 107 to interact with the allocation subsystem 170. The API server 107 may include a Representational state transfer ("REST") server, which may employ an RESTful web service architecture. The API server 107 may forward requests to a load balancer 109, which may forward the request to an allocation service 120 (illustrated in FIG. 1 as allocation services 120A-N). It should be noted that the load balancer 109 may refer to load balancing of the allocation services 120, not necessarily an allocation of computational resources that some examples of the allocation service 120 may perform.

In some examples, the user may input an "operational parameter" to provide input parameters to tune system operation in various contexts. As such, the term "operational parameter" used herein throughout may refer to an input parameter that a user may tune according to particular implementations or uses of the system.

In some examples, each allocation service 120 may include an instance of a service that executes on a physical or virtual machine. In some examples, the load balancer 109 may select a given allocation service 120 for servicing requests from the client device 103 to the allocation subsystem 170. Such requests may include requests to allocate a value to be provided or assess a value already provided to an entity 111. The allocation service 120 may allocate a value to an entity 111. Such allocation may be stored as an allocation event in an event store 110. An allocation event may include an allocation of value provided to an entity 111, an identification of the entity 111, and/or one or more features associated with the entity 111 or the allocation event. In some examples, each of the one or more features may belong to a given feature bin 113 (illustrated in FIG. 1 as feature bins 113A-N). In some examples, an entity 111 may be associated with a feature from one, some, or all of the feature bins 113.

It should be noted that an entity 111 may be referred to herein throughout as a "reference entity" when that entity's data, such as an allocation event of the entity, is used for machine-learning as described herein. Furthermore, a given entity 111 may be referred to herein throughout as a "target entity" when that entity's data, such as features, are used to allocate or assess a value provided to that entity based on machine-learning comparisons of the target entity to other (reference) entities.

Figure 8:
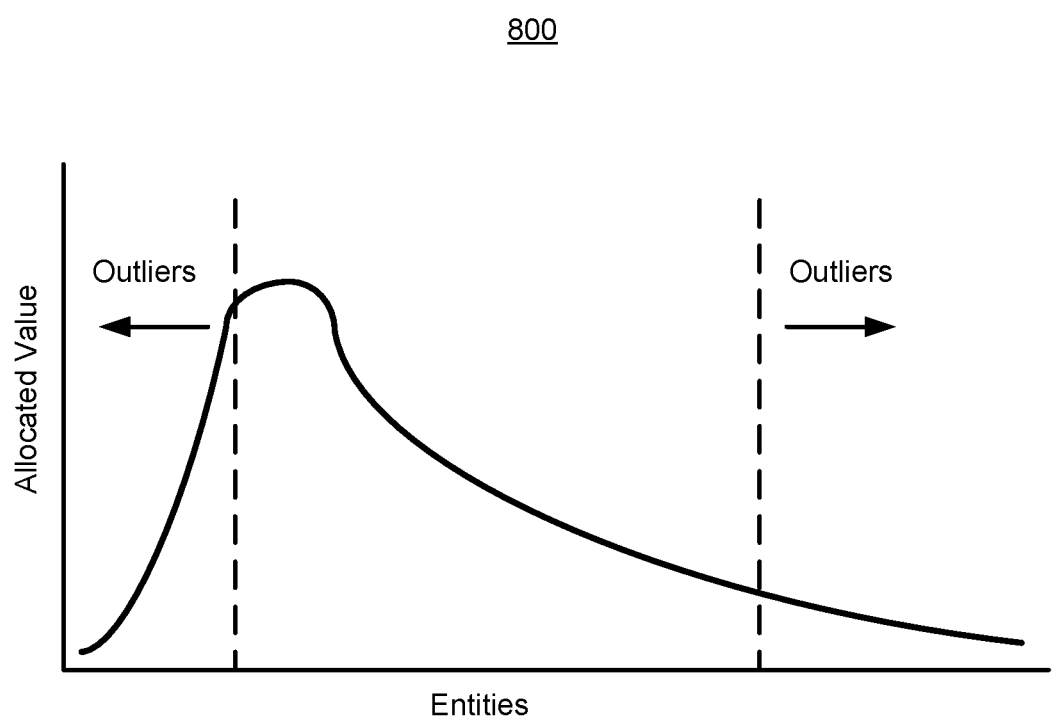
FIG. 8 depicts a two-dimensional plot of a distribution of value allocations for clustered entities, in accordance with an embodiment of the present disclosure.

In some examples, the apparatus 100 may access, from the event store 110, features of reference entities and allocations of values provided to the reference entities to identify relevant features that explain or otherwise correlate to the allocation of values. Put another way, the apparatus 100 may train machine-learning models to identify features that may be predictors of value allocations. The apparatus 100 may train machine-learning models to cluster a target entity with reference entities based on the identified features and generate a distribution of allocated values for the cluster. An example plot of a distribution is illustrated at FIG. 8. In this manner, an allocation of value for the target entity may be determined or assessed based on the distribution and any outliers in the distribution. The apparatus 100 may implement the foregoing multi-stage machine-learning (which may be sequential in that feature identification/weighting may be followed by clustering) since the number of features and feature bins 113 may be large and otherwise difficult to analyze. Likewise, sparseness of data in any given feature bin 113 may result in noisy or low signal analysis with respect to that feature bin 113.

To illustrate, attention will next turn to an example of the features and feature bins 113 with reference to FIG. 2, which shows a block diagram 200 of examples of feature bins 113 depicted in FIG. 1, in accordance with an embodiment of the present disclosure. Each feature bin 113 may include a grouping of related features. For example, feature bin 113A may include grouping of features $1$-$N_A$; feature bin 113B may include a grouping of features $10$-$N_B$; and feature bin 113N may include a grouping of features $20$-$N_Z$. Other numbers of feature bins 113 and features within the feature bins 113 may occur as well.

Each feature may be stored as a variable that encodes information that depends on the particular implementation. For example, in the context of load balancing or computational resource allocation (such as in a cloud service or storage provider or other computational resource allocation implementation), the features may describe characteristics of a request for computational resources for which an allocation of the computational resources is to be determined or assessed. In the context of a CPQ system, the features may describe characteristics of a customer for which an allocation of pricing or discounting is to be determined or assessed.

To illustrate, a feature bin 113A may relate to a region such as a geographic location associated with an entity 111. In the context of computational resource allocation, the geographic location (such as "Southeast U.S.") may describe an origin of a request (the "entity" in this context), which may indicate a number of network hops to service the request. In the context of CPQ systems, the geographic location may describe a location of a customer (the "entity" in this context). Thus, the feature bin 113A in this context may have a wide range of features corresponding to different geographic locations. It should be noted that the granularity of the geographic location may vary such as a continent, country, region of a country, locale, etc.

To further illustrate, a feature bin 113B may relate to a sector or type of service. In the context of computational resource allocation, the sector or type of service may describe a type of service that has been requested. Various types of services may be requested, such as computational or storage, specific type of service such as execution of an online application, and so forth. In the context of CPQ systems, the sector or type of service may describe a sector with which the customer is associated (such as a "manufacturing" sector). Thus, the feature bin 113B in this context may also have a wide range of features corresponding to different sectors or types of services.

To illustrate still further, a feature bin 113N may relate to a size or other quantification. In the context of computational resource allocation, the size may describe a duration of service requested, an estimated size of the computational resources to be used, and so forth. In the context of CPQ systems, the size may describe a size of the customer (such as based on a number of employees or other metric). Thus, the feature bin 113N in these contexts may also have a wide range of features corresponding to different sized metrics.

In either of the foregoing examples and in other examples for which entities may be associated with multiple features that are used for decisioning, a combinatorial decisioning issue may occur in which many groups of features across feature bins 113 may occur. The sizes of the groups may be arbitrary and have different numbers of results. For example, in CPQ systems, a grouping of Southeast U.S. (region feature bin 113A) firms, engaged in manufacturing (sector feature bin 113B), having >1000 employees (size feature bin 113N) may result in 137 resulting entities whereas a grouping of Central Asia firms engaged in telecom with <100 employees may result in only four resulting entities. Thus, it may be difficult to allocate a price or discount for a Central Asia firm engaged in telecoms with <100 employees. In other words, due to the combinatorial decisioning issue, it may be difficult to identify entities similar to a target entity for comparison so that a comparable allocation of value may be provided to the target entity based on comparable entities.

To illustrate further, suppose P represents a baseline value to be allocated. P may be a non-discounted price, computational resource allocation, and/or the like, with expected performance depending on the particular implementation. The example that follows will use price in a CPQ system for illustrative convenience, although other types of value may be determined based on combinatorial decisioning. In a combinatorial pricing strategy, the overall discounted price for a given customer may be expressed according to equation (1):

$$Prsz = (1-dr)1-ds)(1-dz)P \qquad (1),$$

in which:

Prsz is an overall discounted price for a customer,
dr is a region-based discount for a customer's region,
ds is a sector-based discount for a customer's sector, and
dz is a size-based discount for the customer's size.

To illustrate an example of equation (1), suppose a 5% discount is provided to customers in region (r), a 7% discount is provided to customers involved in a sector (s), and a 1% discount is provided to customers having a particular size (z). The Prsz may be expressed as 0.95*0.93*0.99=0.875 P.

In some examples, a given customer may be provided with a further discount, εi, in which case the final price, P, for that customer may be Prsz minus εi. Because of the combinatorial decisioning issue previously mentioned, it may be difficult for combinatorial decisioning systems to allocate or assess a value, such as Prsz in a CPQ system or a computational resource in a computational resource allocation system. It should be noted that the apparatus 100 may take into account the discount ci when identifying features (such as by identifying features that may be predictive of providing such discount ci).

The combinatorial decisioning issue may be further exacerbated by the total number of combinations of features, which may be given by equation (2):

$$N_A * N_B * N_Z \qquad (2),$$

in which:

$N_A$ is the total number of features in feature bin 113A,
$N_B$ is the total number of features in feature bin 113B, and
$N_Z$ is the total number of features in feature bin 113N.

Thus, combinatorial decisioning issues may be further exacerbated by the number of features associated with reference entities. It should be noted that the combinatorial decisioning issue may be exacerbated by additional feature bins 113 and features within the feature bins as well. To address these and other issues, the apparatus 100 depicted in FIG. 1 may conduct multi-stage machine-learning to identify features that are relevant in combinatorial decisioning and cluster entities that are similar to one another with respect to the identified features.

Figure 3:
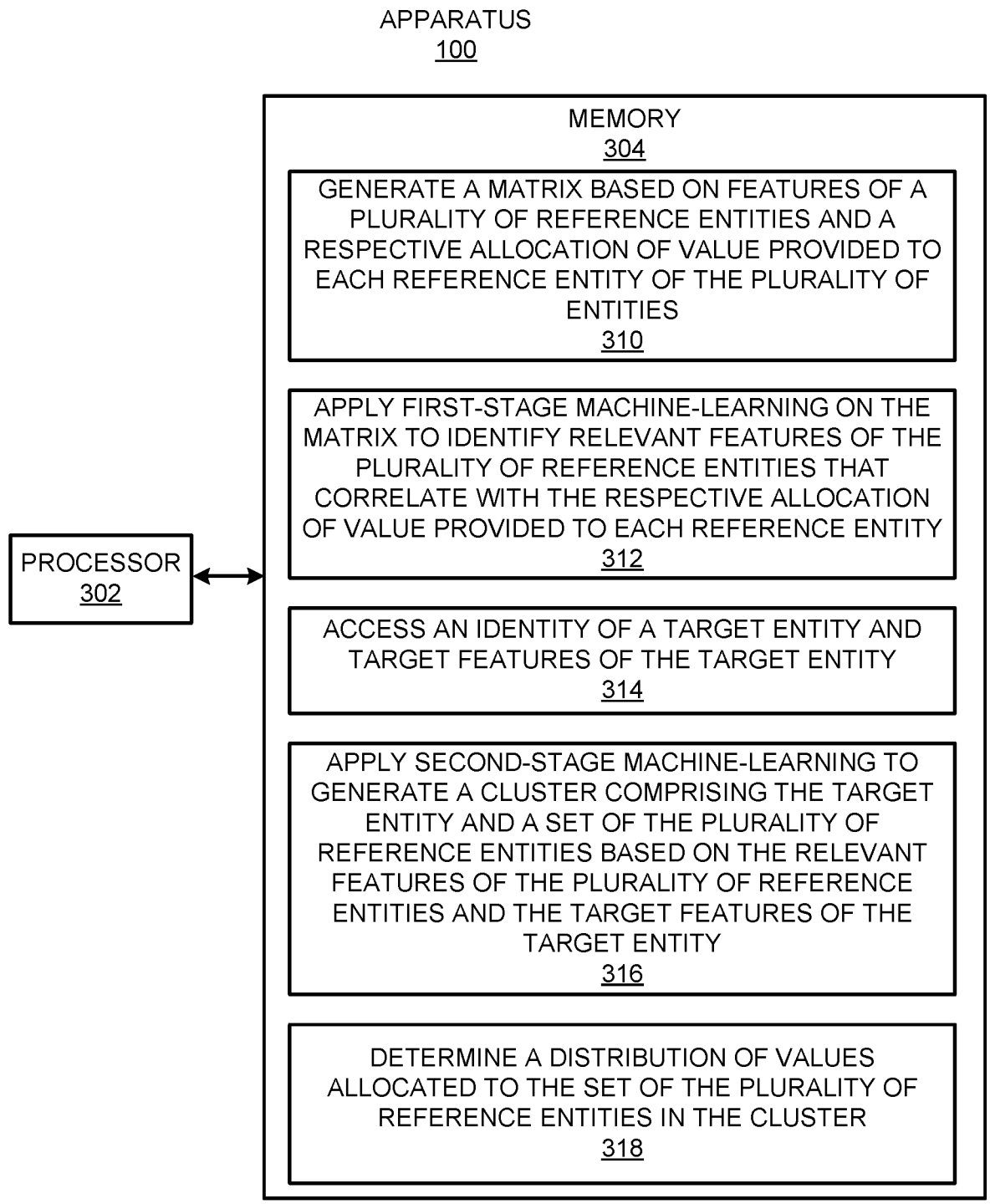
FIG. 3 shows a block diagram of the apparatus depicted in FIG. 1, in accordance with an embodiment of the present disclosure.

Reference will now be made to FIG. 3, which shows a block diagram of the apparatus 100 depicted in FIG. 1, in accordance with an embodiment of the present disclosure.

The apparatus 100 may be a computing device such as a server blade, a laptop computer, a tablet computer, a smartphone, or the like. The apparatus 100 may include a processor 302 that may control operations of various components of the apparatus 100 and a memory 304 on which data that the processor 302 may access and/or may execute may be stored.

The processor 302 may be a semiconductor-based microprocessor, a central processing unit (CPU), an application specific integrated circuit (ASIC), a field-programmable gate array (FPGA), and/or other hardware device. The memory 304, which may also be termed a machine-readable medium, may be, for example, a Random Access memory (RAM), an Electrically Erasable Programmable Read-Only Memory (EEPROM), a storage device, or the like. The memory 304 may be a non-transitory computer-readable storage medium, where the term "non-transitory" does not encompass transitory propagating signals. In any regard, the memory 304 may have stored thereon machine-readable instructions that the processor 302 may execute to control various operations of the apparatus 100.

Although the apparatus 100 is depicted as having a single processor 302, it should be understood that the apparatus 100 may include additional processors and/or cores without departing from a scope of the apparatus 100. In this regard, references to a single processor 302 as well as to a single memory 304 may be understood to additionally or alternatively pertain to multiple processors 302 and multiple memories 304. In addition, or alternatively, the processor 302 and the memory 304 may be integrated into a single component, e.g., an integrated circuit on which both the processor 302 and the memory 304 may be provided.

As shown in FIG. 3, the memory 304 may have stored thereon machine-readable instructions 310-318 that the processor 302 may execute. Although the instructions 310-318 are described herein as being stored on a memory and may thus include a set of machine-readable instructions, the apparatus 100 may include hardware logic blocks that may perform functions similar to the instructions 310-318. For instance, the processor 302 may include hardware components that may execute the instructions 310-318. In other examples, the apparatus 100 may include a combination of instructions and hardware logic blocks to implement or execute functions corresponding to the instructions 310-318. In any of these examples, the processor 302 may implement the hardware logic blocks and/or execute the instructions 310-318. As discussed herein, the apparatus 100 may also include additional instructions and/or hardware logic blocks such that the processor 302 may execute operations in addition to or in place of those discussed above with respect to FIG. 2.

The processor 302 may execute the instructions 310 to generate a matrix based on features (such as feature bins 113 illustrated in FIG. 1) of a plurality of reference entities (such as entities 111 illustrated in FIG. 1) and a respective allocation of value provided to each reference entity of the plurality of entities. The matrix based on features will be described in more detail with reference to the feature matrix 413 illustrated in FIG. 4.

The processor 302 may execute the instructions 312 to apply first-stage machine-learning on the matrix to identify relevant features of the plurality of reference entities that correlate with the respective allocation of value provided to each reference entity. In some examples, the processor 302 may, based on the first-stage machine-learning, generate a respective weight for each feature based on a level of correlation between a corresponding feature and a corresponding allocation value learned during the first-stage machine-learning.

In some examples, to apply the first-stage machine-learning on the matrix, the processor 302 may perform a linear regression to identify the features that correlate with the allocated values. For example, the processor 302 may apply supervised machine-learning to identify features that affect the allocated values. In a particular example, the processor 302 may use a Least Absolute Shrinkage and Selection Operator ("LASSO") for machine-learning models.

In some examples, the processor 302 may evaluate the supervised machine-learning models. For example, the processor 302 may perform k-fold cross-validation in which the data (such as the data in the matrix) may be sub-sampled into k number of groups to evaluate whether the identified features from a LASSO model correlate with the allocated values. To illustrate, a LASSO model may identify features predicted to explain observed prices (an allocated value in which the price may be reflective of a discount value allocated to an entity) in a CPQ system. The processor 302 may evaluate the LASSO model by determining an error between a predicted price (according to the LASSO model) and an actual price (according to the data in the matrix) in order to minimize mean square error ("MSE") or one or more standard deviation(s) above a minimum MSE. The MSE may be set based on an operational parameter input by an operator of the system.

In some examples, the processor 302 may perform preprocessing in connection with the first-stage machine-learning. Such pre-processing may prepare the data for supervised machine-learning. For example, the processor 302 may identify non-linearities in the features (where the identified relevant features are based on the non-linearities), apply a factor encoding to some or all of the features in the matrix, demean the features in the matrix to normalize the features, and/or perform other pre-processing.

To identify non-linearities, the processor 302 may use Multivariate Adaptive Regression Spline ("MARS"), cubic transformations to model interactions in independent variables (such as features in the matrix), or the like. To apply factor encoding, the processor 302 may encode categorical variables (such as features) for analysis. For example, the processor 302 may assign a numeric or other representation of each feature for quantitative analysis. The processor 302 may normalize the variables by demeaning the variables (which may be encoded through factor encoding). In some examples, the processor 302 may divide the demeaned variables by a standard deviation and/or other value.

In some examples, multicollinearity may occur in the data in which multiple features may correlate with an allocated value. As such, the processor 302 may run the supervised machine-learning model with multiple selected seed features and take the intersection of the various selected features. For example, the processor 302 may access a set of seed features from the matrix, execute a supervised machine-learning model based on the set of seed features, and identify an intersection of the set of seed features to identify the features that correlate with the allocated values. In this manner, multicollinearity of features to the allocated value may be identified through their intersection.

The processor 302 may execute the instructions 314 to access an identity of a target entity and target features of the target entity. For example, a target entity may be one for which an allocation of value is to be determined or assessed. In the context of resource allocation, a target entity may include a request for resources in a distributed and load-balanced resource allocation system and the allocation of value may include an allocation of computational or network resources is to be determined or assess relative to similar requests. In the context of CPQ systems, a target entity may include a customer for which pricing for a certain product or service is determined or assessed relative to similar customers.

The processor 302 may execute the instructions 316 to apply second-stage machine-learning to generate a cluster including the target entity and a set of the plurality of reference entities based on the relevant features of the plurality of reference entities and the target features of the target entity. The set may include some or all of the plurality of reference entities. The second-stage machine-learning may generate a model that groups entities based upon the features identified in the first-stage. In some examples, the identified features may have been weighted by their estimated average importance during the first-stage machine-learning.

To generate the cluster, the processor 302 may use unsupervised machine-learning to learn the structure of the data (such as the data in the matrix) and therefore which entities in the structure are similar to one another. In some examples, the processor 302 may determine a distance metric between entities. The distance metric may indicate a level of similarity between a given set of (two or more) entities based on a distance between quantitative values that represent each entity. For example, each entity, such as the reference entities and the target entity, may be represented by a feature vector that quantifies the features (such as the identified features from the first-stage machine-learning) of the entity. The processor 302 may determine the distance metric based on a Euclidean distance metric (that obtains a distance between any two n-dimensional points in Euclidean space, where n is one or more) between quantitative values of a reference entity and the target entity, perform K Nearest Neighbors ("KNN") comparisons based on the quantitative values of the reference entities and the target entity, and/or other distance metric for identifying a distance metric between entities. In particular, the processor 302 may determine a distance metric between the feature vector of the target entity and the feature vector of one or more of the reference entities for Euclidean, KNN, and/or other types of comparisons.

An example of KNN for clustering will be described for illustrative purposes. The processor 302 may initialize k to a given number of neighbors. The number of neighbors may be set based on an operational parameter. The processor 302 may determine a distance between the target entity feature and the reference entity feature. The processor 302 may add the distance and the index of the comparison (which may identify the target entity and/or the reference entity) to an ordered collection. The processor 302 may sort the ordered collection of distances and indices from smallest to largest (in ascending order, or vice versa). The processor 302 may select the first (or last, depending on the sorting) k entries from the sorted collection.

In whichever manner the clustering is performed, in some examples, to apply second-stage machine-learning to generate the cluster, the processor 302 may limit a size of the cluster based on a minimum number and/or maximum number. For example, the processor 302 may limit the comparisons for clustering to a minimum and/or maximum number of entities in a given comparison group. The minimum and/or maximum number may be input as an operational parameter of the system. For example, the processor 302 may cluster reference entities at least until a minimum number of reference entities have been clustered with the target entity and/or stop when a maximum number of reference entities have been clustered with the target entity.

In some examples, to apply second-stage machine-learning to generate the cluster, the processor 302 may set a minimum fidelity threshold for which the model will not cluster reference entities with the target entity. The minimum fidelity threshold may be input as an operational parameter of the system. In these examples, the processor 302 may ensure a minimum quality of clustering such that no clustering will be performed if reference entities do not meet the minimum fidelity threshold in terms of similarity to the target entity. It should be noted that the processor 302 may use the minimum number, maximum number, and/or minimum fidelity threshold together or separately for clustering.

In some examples, to apply second-stage machine-learning to generate the cluster, the processor 302 may aggregate comparisons non-parametrically. In this manner, the processor 302 may account for non-normal distributions.

In some examples, to apply second-stage machine-learning to generate the cluster, processor 302 may align comparisons with a predetermined level in the product hierarchy or inventory application. For example, in CPQ systems, the comparisons for clustering may be based on operational parameters input via a product or service hierarchy or inventory application, which may execute on the client device 103 shown in FIG. 1.

The processor 302 may execute the instructions 318 to determine a distribution of values allocated to the set of the plurality of reference entities in the cluster, the distribution of values being used to generate or assess a target allocation of value for the target entity. In some examples, the processor 302 may identify outliers of the distribution, the outliers being used to guide the generation of the target allocation.

Figure 4:
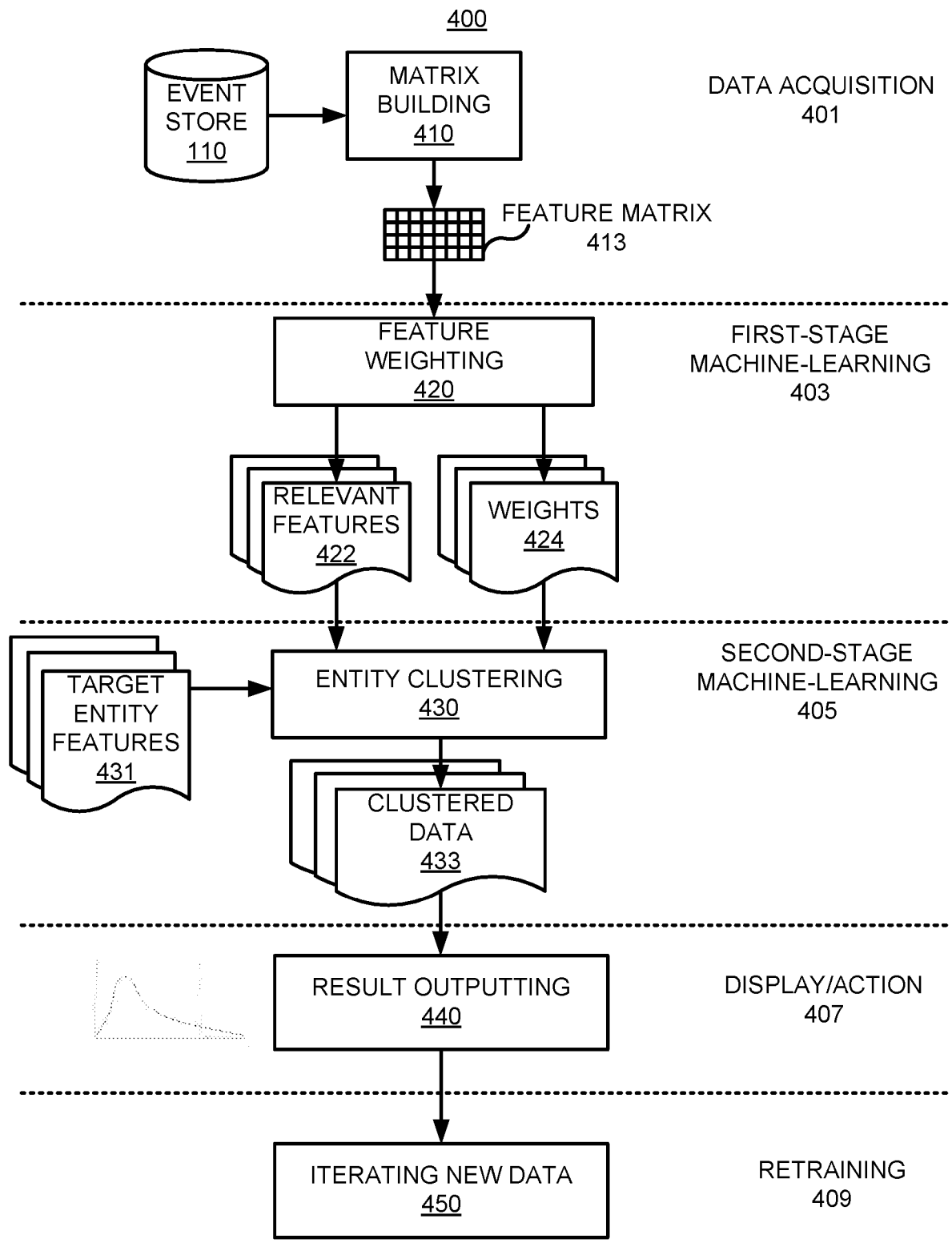
FIG. 4 shows a diagram of a machine-learning architecture of the apparatus shown in FIG. 1, in accordance with an embodiment of the present disclosure.

FIG. 4 shows a diagram of a machine-learning architecture 400 of the apparatus 100 shown in FIG. 1, in accordance with an embodiment of the present disclosure. Reference to the apparatus 100 shown in FIGS. 1 and 2 will be made with respect to FIG. 4. It should be understood that the apparatus 100 depicted in FIGS. 1 and 2 may include additional features and that some of the features described herein may be removed and/or modified without departing from the scope of the machine-learning architecture 400.

The machine-learning architecture 400 may include multiple phases, including data acquisition 401, first-stage machine learning 403, second-stage machine-learning 405, display/action 407, and retraining 409. Other phases may be included as well, and some phases may be merged with others.

In some examples, data acquisition 401 may include matrix building 410. At matrix building 410, the apparatus 100 may access the event store 110 (also shown in FIG. 1). The apparatus 100 may generate a feature matrix 413. In some examples, each row in the feature matrix 413 may represent an allocation event that occurred and was recorded for a reference entity (such as an entity 111 illustrated in FIG. 1). In a CPQ context, each row in the feature matrix 413 may represent a transaction including price and/or discount (allocated value) provided to a customer (entity). In some examples of the CPQ context, each row may represent a stock keeping unit of a product or service provided to a customer. In a computational resource allocation context, each row in the feature matrix 413 may represent an allocation of a computational resource. In either and other examples, columns in the feature matrix 413 may correspond to features relating to the allocation event. For example, the features may relate to the customer or a request for computational resources. As previously noted, the number of features available and encoded in the feature matrix 413 may result in a combinatorial decisioning issue. Thus, the apparatus 100 may to implement the machine-learning architecture 400 to identify relevant features for clustering entities to identify a distribution of allocated values.

In some examples, first-stage machine-learning 403 may include feature weighting 420. At feature weighting 420, the apparatus 100 may apply supervised machine-learning to identify features that are predictive and potentially explain why a given value allocation was provided to reference entities. Because some features may be more predictive than others (such as by being more likely to be involved in affecting value allocations), the apparatus 100 may assign a weight to features. The apparatus 100 may use the weights to identify the relevant features (such as by selecting N features with the top weights, where N may be a number that may be an operational parameter). In some CPQ system examples, a given stock keeping unit may be weighted by baseline price spend to increase (or decrease) a weight for SKUs that are most important (or least important) for a customer's revenue.

In some examples, second-stage machine-learning 405 may include entity clustering 430. At entity clustering 430, to generate the clustered data 433, the apparatus 100 may cluster target entity features 432 with features of reference entities of the feature matrix 413 based on their respective relevant features identified from the first-stage machine-learning 403. The clustered data 433 may include the target entity and the reference entities that were clustered with the target entity. In this example, the machine-learning architecture 400 may use multi-stage and sequential machine-learning.

In some examples, display/action 407 may include result outputting 440. For example, a distribution of the value allocations for the cluster identified at the second-stage machine-learning 405 may be provided for display, such as through the front end UI 105. In some examples, outliers on the distribution may be displayed as well, so as to guide value allocations and/or assess value allocations given to a target entity. For example, in a CPQ context with discounts, if a customer has discount larger than 90% of their algorithmically determined cohort, the user may target lower discounts for that customer. Conversely, if a customer has a smaller discount than 90% of their algorithmically determined cohort, their discount may not be excessive and the user may respond appropriately. Such decision support may also be applicable for computational resource allocation or other contexts that may experience combinatorial decisioning issues.

In some examples, retraining 409 may include iterating new data 450. For example, as new value allocations are added to the event store 110, the machine-learning architecture 400 may retrain the feature weighting and/or entity clustering models, respectively at 420 and 430.

Various manners in which the processor 302 of the apparatus 100 may operate are discussed in greater detail with respect to the methods 500 and 600 respectively depicted in FIGS. 5 and 6. Particularly, FIGS. 5 and 6 respectively depict flow diagrams of a method 500 for identifying relevant features that correlate with allocated values for reference entities and a method 600 for clustering a target entity with reference entities based on features identified by the method 500 illustrated in FIG. 5, in accordance with embodiments of the present disclosure. It should be understood that the methods 500 and 600 respectively depicted in FIGS. 5 and 6 may include additional operations and that some of the operations described therein may be removed and/or modified without departing from the scopes of the methods 500 or 600. The descriptions of the methods 500 and 600 are each made with reference to the features depicted in FIGS. 1 and 3 for purposes of illustration.

With reference first to FIG. 5, at block 502, the processor 302 may access features of a plurality of reference entities and a respective allocation of value provided to each reference entity of the plurality of reference entities. The features may describe a reference entity and the allocation of value may include a unit of value provided to the reference entity. The data may reflect empirical data of value allocations and entity features. Such data may be mined for identifying features and their relative importance in explaining why the value allocations were provided to an entity. Put another way, the method 500 may apply supervised machine-learning to identify features and corresponding weights that correlate to value allocations.

At block 504, the processor 302 may pre-process the features for machine-learning. Such pre-processing may include identifying relevant non-linearities in independent variables, performing factor encoding on categorical variables, normalizing variables, and/or performing other pre-processing.

At block 506, the processor 302 may identify relevant features of the reference entities and corresponding weights of the features that correlate with the allocation of value provided to each reference entity. For example, the method 500 may identify features of reference entities that may explain why a respective allocation of value was provided to a reference entity.

With reference to FIG. 6, at block 602, the processor 302 may access an identity of a target entity to which a value for the target entity is to be allocated or assessed. For example, the identity of the target entity may be input by an operator of a system (such as system 101 illustrated in FIG. 1) to determine or assess an allocation of value for the target entity based on a comparison of the target entity with other entities that are similar to the target entity. In this example, such similarity may be based on a clustering procedure.

For example, at block 604, the processor 302 may cluster the target entity and a plurality of reference entities based on relevant features that correlate with allocated values for the plurality of reference entities, the relevant features being identified from unsupervised machine-learning to identify the relevant features. To perform such clustering, the method 500 may include identifying a k-nearest neighbor from among the plurality of reference entities based on the relevant features of the target entity. Other distance-based metrics techniques (other than k-nearest neighbor techniques) may be used as well. In some examples, the clustering may be based on a bounded cluster size. For example, the method 500 may include bounding a cluster size for the clustering based on a minimum size and a maximum size. In this manner, the operator of the system may provide operational parameters specifying a minimum or maximum size of the cluster (in which smaller cluster sizes may produce tighter distributions of allocated values.

At block 606, the processor 302 may determine a distribution of allocated values based on the clustering, wherein the distribution is to be used to determine the value to be allocated for the entity or assess a value that has been allocated for the entity. In some examples, the method 600 may provide a description of why certain customers are in the comparison group (such as the cluster). In some examples, the description may be provided via an interface, such as the front end UI 105 illustrated in FIG. 1.

In some examples, the description may include a comparison of all relevant features of the target entity and the reference entities. In other examples, the description may include a comparison of a subset of the relevant features that with the closest and furthest values.

For example, the method 600 may include identifying a first subset of the relevant features used for clustering, the first subset of the relevant features exhibiting the closest M distances between the target entity and the plurality of reference entities and transmitting the first subset of the relevant features for display. M may include a tunable integer that may be input as an operational parameter. In this example, the description may indicate a subset of features that show a closest similarity to the reference entities in the cluster.

In another example, the method 600 may include identifying a second subset of the relevant features used for clustering, the second subset of the relevant features exhibiting the further N distances between the target entity and the plurality of reference entities and transmitting the second subset of the relevant features for display. In this example, N may include a tunable integer that may be input as an operational parameter. In this example, the description may indicate a subset of features that show least (relative to other features) similarity to the reference entities in the cluster.

Some or all of the operations set forth in the methods 500 and 600 may be included as utilities, programs, or subprograms, in any desired computer accessible medium. In addition, the methods 500 and 600 may each be embodied by computer programs, which may exist in a variety of forms both active and inactive. For example, they may each exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

FIG. 7 depicts a block diagram of a computer-readable medium 700 that may have stored thereon computer-readable instructions 702-710 for performing machine-learning to identify features that are predictive of a value allocated to reference entities to determine or assess a target allocation for a target entity, in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The computer-readable medium 700 may be a non-transitory computer-readable medium, in which the term "non-transitory" does not encompass transitory propagating signals.

The computer-readable medium 700 may have stored thereon machine-readable instructions 702-710 that a processor, such as the processor 302 depicted in FIGS. 1 and 2, may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to generate a matrix based on features of a plurality of reference entities and a respective allocation of value provided to each reference entity of the plurality of entities.

The processor may fetch, decode, and execute the instructions 704 to identify relevant features of the plurality of reference entities that correlate with the respective allocation of value provided to each reference entity. The processor may fetch, decode, and execute the instructions 706 to access an identity of a target entity and target features of the target entity.

The processor may fetch, decode, and execute the instructions 708 to generate a cluster including the target entity and a set of the plurality of reference entities based on the relevant features of the plurality of reference entities and the target features of the target entity, the set including some or all of the plurality of reference entities.

The processor may fetch, decode, and execute the instructions 710 to determine a distribution of values allocated to the set of the plurality of reference entities in the cluster, the distribution of values being used to generate or assess a target allocation of value for the target entity.

Although not expressly described, various components shown in FIG. 1 such as the client device 130, API server 107, and components of the allocation subsystem 170 may each be a computing device such as a server blade, laptop computer, a tablet computer, a smartphone, or the like. Each of these components may include a processor programmed by instructions stored at a memory, on which data that the processor may access and/or may execute may be stored. Furthermore, although the apparatus 100 is shown in FIG. 1 as being separate from the allocation subsystem 170, the apparatus 100 may be part of one or more components of the allocation subsystem 170.

FIG. 8 depicts a two-dimensional plot 800 of a distribution of value allocations for clustered entities, in accordance with an embodiment of the present disclosure. The distribution is shown as a curve with outlier values indicated starting at outlier values corresponding to the dashed lines.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory storing instructions that when executed cause the processor to:
      generate a matrix based on features of a plurality of reference entities and a respective allocation of value provided to each reference entity of the plurality of reference entities;
      apply first-stage machine-learning on the matrix to identify relevant features of the plurality of reference entities that correlate with the respective allocation of value provided to each reference entity;
      access an identity of a target entity and target features of the target entity;
      apply second-stage machine-learning to generate a cluster comprising the target entity and a set of the plurality of reference entities based on the relevant features of the plurality of reference entities and the target features of the target entity, the set comprising some or all of the plurality of reference entities, wherein the second-stage machine-learning is an unsupervised machine-learning; and
      determine a distribution of values allocated to the set of the plurality of reference entities in the cluster, the distribution of values being used to generate or assess a target allocation of value for the target entity.

2. The apparatus of claim 1, wherein the instructions further cause the processor to:
   identify outliers of the determined distribution of values, the outliers being used to guide the generation of the target allocation.

3. The apparatus of claim 1, wherein to apply the first-stage machine-learning on the matrix, the instructions further cause the processor to:
   perform a linear regression to identify the relevant features that correlate with allocations of value in the matrix.

4. The apparatus of claim 1, wherein to apply the first-stage machine-learning on the matrix, the instructions further cause the processor to:
   access a set of seed features from the matrix;
   execute a supervised machine-learning model based on the set of seed features; and
   identify an intersection of the set of seed features to identify the relevant features that correlate with allocated values in the matrix.

5. The apparatus of claim 1, wherein to apply the first-stage machine-learning on the matrix, the instructions further cause the processor to:
   identify non-linearities in the relevant features, wherein the relevant features are identified based on the non-linearities.

6. The apparatus of claim 1, wherein to apply the first-stage machine-learning on the matrix, the instructions further cause the processor to:
   apply a factor encoding to some or all of the relevant features in the matrix.

7. The apparatus of claim 1, wherein to apply the first-stage machine-learning on the matrix, the instructions further cause the processor to:
   demean the relevant features in the matrix to normalize the relevant features.

8. The apparatus of claim 1, wherein the instructions further cause the processor to:
generate a respective weight for each relevant feature based on a level of correlation between the relevant feature and a corresponding allocation value learned during the first-stage machine-learning.

9. The apparatus of claim 8, wherein to apply the second-stage machine-learning to generate the cluster, the instructions further cause the processor to:
limit a size of the cluster based on a minimum number and/or or a maximum number.

10. The apparatus of claim 8, wherein to apply the second-stage machine-learning to generate the cluster, the instructions further cause the processor to:
set a minimum fidelity threshold for which the second-stage machine-learning will not cluster reference entities with the target entity.

11. The apparatus of claim 8, wherein to apply the second-stage machine-learning to generate the cluster, the instructions further cause the processor to:
aggregate comparisons non-parametrically for clustering.

12. The apparatus of claim 8, wherein to apply the second-stage machine-learning to generate the cluster, the instructions are further to cause the processor to:
align comparisons with a predetermined level in a product hierarchy or inventory application.

13. A method comprising:
generating, by a processor, a matrix based on features of a plurality of reference entities and a respective allocation of value provided to each reference entity of the plurality of reference entities;
applying, by the processor, first-stage machine-learning on the matrix to identify relevant features of the plurality of reference entities that correlate with the respective allocation of value provided to each reference entity;
accessing, by the processor, an identity of a target entity and target features of the target entity;
applying, by the processor, second-stage machine-learning to generate a cluster comprising the target entity and a set of the plurality of reference entities based on the relevant features of the plurality of reference entities and the target features of the target entity, the set comprising some or all of the plurality of reference entities, wherein the second-stage machine-learning is an unsupervised machine-learning; and
determining, by the processor, a distribution of values allocated to the set of the plurality of reference entities in the cluster, the distribution of values being used to generate or assess a target allocation of value for the target entity.

14. The method of claim 13, further comprising:
identifying outliers of the determined distribution of values, the outliers being used to guide the generation of the target allocation.

15. The method of claim 12, wherein applying the first-stage machine-learning on the matrix comprises:
accessing a set of seed features from the matrix;
executing a supervised machine-learning model based on the set of seed features; and
identifying an intersection of the set of seed features to identify the relevant features that correlate with allocated values in the matrix.

16. The method of claim 13, further comprising:
generating a respective weight for each relevant feature based on a level of correlation between the relevant feature and a corresponding allocation value learned during the first-stage machine-learning.

17. A non-transitory computer readable medium storing instructions that when executed by a processor cause the processor to:
generate a matrix based on features of a plurality of reference entities and a respective allocation of value provided to each reference entity of the plurality of reference entities;
apply first-stage machine-learning on the matrix to identify relevant features of the plurality of reference entities that correlate with the respective allocation of value provided to each reference entity;
access an identity of a target entity and target features of the target entity;
apply second-stage machine-learning to generate a cluster comprising the target entity and a set of the plurality of reference entities based on the relevant features of the plurality of reference entities and the target features of the target entity, the set comprising some or all of the plurality of reference entities, wherein the second-stage machine-learning is an unsupervised machine-learning; and
determine a distribution of values allocated to the set of the plurality of reference entities in the cluster, the distribution of values being used to generate or assess a target allocation of value for the target entity.

18. The non-transitory computer readable medium of claim 17, wherein the instructions further cause the processor to:
identify outliers of the determined distribution of values, the outliers being used to guide the generation of the target allocation.

19. The non-transitory computer readable medium of claim 17, wherein to apply the first-stage machine-learning on the matrix, the instructions further cause the processor to:
access a set of seed features from the matrix;
execute a supervised machine-learning model based on the set of seed features; and
identify an intersection of the set of seed features to identify the relevant features that correlate with allocated values in the matrix.

20. The non-transitory computer readable medium of claim 17, wherein the instructions further cause the processor to:
generate a respective weight for each relevant feature based on a level of correlation between the relevant feature and a corresponding allocation value learned during the first-stage machine-learning.

* * * * *